United States Patent [19]
Zamara et al.

[11] Patent Number: 5,917,990
[45] Date of Patent: Jun. 29, 1999

[54] PROCESS FOR PRECISELY IDENTIFYING A DESIRED LOCATION ON A VIDEO TAPE

[75] Inventors: Christopher J. Zamara, Gilroy; Ivan J. Maltz, Pleasanton, both of Calif.

[73] Assignee: Pinnacle Systems, Inc., Mountain View, Calif.

[21] Appl. No.: 09/064,677

[22] Filed: Apr. 22, 1998

[51] Int. Cl.⁶ .................................................. H04N 5/76
[52] U.S. Cl. ............................................ 386/95; 386/111
[58] Field of Search ............................... 386/46, 95, 121, 386/111, 68, 81, 65, 52, 83; H04N 5/76

[56] References Cited

U.S. PATENT DOCUMENTS

| | | | |
|---|---|---|---|
| 5,365,384 | 11/1994 | Choi | 386/95 |
| 5,532,773 | 7/1996 | Shaw et al. | 353/26 A |
| 5,546,191 | 8/1996 | Hibi et al. | 386/95 |
| 5,587,789 | 12/1996 | Lee et al. | 386/68 |
| 5,642,285 | 6/1997 | Woo et al. | 364/449 |
| 5,659,367 | 8/1997 | Yuen | 386/83 |

*Primary Examiner*—Huy T. Nguyen
*Attorney, Agent, or Firm*—Thomas Schneck; John P. McGuire, Jr.

[57] ABSTRACT

A process that allows precise control of the tape position in consumer videotape devices, such as camcorders, for the purpose of video editing. The process involves the use of a software algorithm within the central processing unit of a computer to locate a specific video frame with digitized video. The process first involves storing an initial set of calculated scene detection data, including luminance and change of luminance values for each video frame. Then, at the time of the video editing, a second set of scene detection data from the videotape is taken at a reference point, near the location of the desired frame. The second set of scene detection data is compared to the first set of scene detection data to determine whether there is any offset between the expected location of the frame, as shown in the first set of scene detection data, and the actual location of the desired frame, as shown in the second set of scene detection data. If there is any offset, the videotape can then be adjusted by the determined amount of offset to locate the desired frame.

20 Claims, 5 Drawing Sheets

PROCESS FOR PRECISELY IDENTIFYING A DESIRED LOCATION ON A VIDEO TAPE

TECHNICAL FIELD

The invention relates to video imaging systems, and more particularly to a process to identify a desired location on a linear storage medium, such as magnetic tape.

BACKGROUND OF THE INVENTION

In the field of video editing, it is often necessary to locate a specific video frame on a video tape. This is sometimes difficult to accomplish since typical consumer devices do not track tape position accurately through repeated transport control operations, such as fast-forward and rewind. Repeated transport control operations can result in the alignment of the videotape being off of its original position, sometimes by several frames. Furthermore, some devices, such as VHS-camcorders, do not provide tape position information through an external interface and can only be controlled via infrared commands, which do not provide any feedback of the tape position or of the current state of the device. In these cases, some other form of accurately tracking tape position is even more important. Some professional video equipment and some expensive consumer equipment support tape time code for accurate tape position indication.

In the prior art, U.S. Pat. No. 5,642,285 to Woo et al., discloses a GPS navigation receiver with a data output port for communicating a position estimate frame-by-frame and time codes in SMPTE format. A data logger records the position estimates with their corresponding time in time code format frame-by-frame in a database. U.S. Pat. No. 5,532,773 to Shaw et al., discloses a method of applying variable, momentous production information to each frame of a continuous visual image medium at the instant of use or after use, without interfering with the formation or display of the normal visual image on the same frame. The recorded production information becomes absolute reference points on the continuous visual image medium, enabling fast and accurate identification and retrieval at a later date.

U.S. Pat. No. 5,587,789 to Lee et al., discloses an apparatus and method for controlling recording and reproduction in a video cassette tape recorder. The apparatus is capable of, in a recording mode, separating specific data for speed-varied reproduction from compressed digital video signals, recording them on designated tracks, recording position information of the designated tracks on a control track by an index head or by recording position information of recording position synchronized blocks at the starting portions of the designated tracks recorded with the specific data.

An object of the invention is to devise a method of accurate tape position indication that can be used with inexpensive equipment without time code.

SUMMARY OF THE INVENTION

The above object has been met with a process that allows precise control of the tape position in a consumer videotape device, such as a camcorder, when accuracy to within one or two video frames is desired. The process involves the use of a software algorithm within the central processing unit of a computer that locates a specific video frame within digitized video data. The process first involves storing an initial set of calculated scene detection data from the video, including luminance data and change of luminance, i.e. delta, values for each video frame. Then, at the time of the video editing, a second set of scene detection data from the videotape is taken at a reference point near the location of the desired frame. The second set of scene detection data is compared to the initial set of scene detection data to determine whether there is any offset between the expected location of the desired frame, as shown in the first set of scene detection data, and the actual location of the desired frame, as shown in the second set of scene detection data. If there is any offset between the expected location of the frame and the actual location of the desired frame, the videotape can then be adjusted by the amount of the determined offset to locate the desired frame.

BEST MODE FOR CARRYING OUT THE INVENTION

Figure 1:
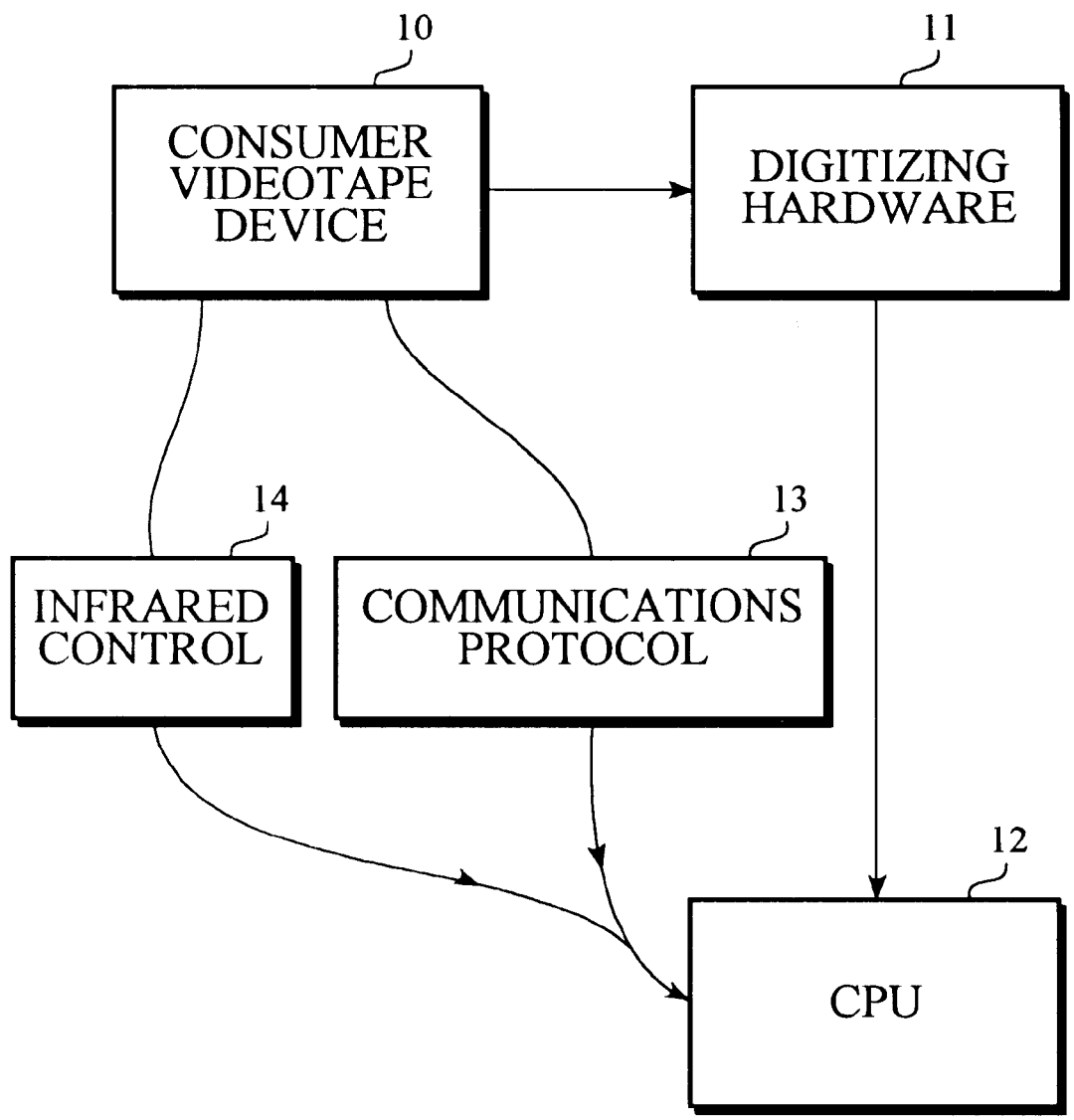
FIG. 1 is a block diagram plan showing an arrangement of apparatus in which the process of the present invention is used.

Referring to FIG. 1, the apparatus used for carrying out the process of the present invention is shown. An event is recorded on videotape. Then, the videotape is placed in a consumer videotape device 10, such a camcorder or a video cassette recorder (VCR). When the videotape is being edited, the video is digitized by digitizing hardware 11, and then the digitized data is stored in the hard drive of a central processing unit (CPU) 12 of a computer.

An alternate way for the video to be sent to the CPU involves connecting the consumer videotape device 10 to the CPU 12 through some kind of communications protocol 13. There are many types of communications protocol, some examples of the communications protocol are the LANC protocol found on some Sony camcorders and VCRs or the Panasonic 5-Pin protocol. These protocols read the tape counter of the consumer videotape device 10 and then the software in the CPU 12 interpolates frame information based on video field counting. This requires an initial resetting of the tape, usually done by rewinding to the start of the tape and resetting the devices tape counter to zero. After resetting the tape, it is possible to seek to an approximate position on the tape by sending appropriate tape transport commands, such as play, cue, review, fast-forward, or rewind, reading the tape counter information to get to a position near the desired position, then engaging play mode and waiting until the tape counter shows the desired position. Usually the consumer videotape device 10 has an edit jack to which the CPU 12 can be connected. An alternate way to control the tape in the consumer videotape device 10 using the CPU 12 is through infrared-control 14 techniques using infrared-controlled camcorders. A technique using infrared-control is a subject of U.S. patent application Ser. No. 08/623,887, "Remote Control Editing System", which is assigned to the assignee of the present invention. Once the digitized data is stored in the hard drive of the CPU, the software algorithm of the present invention works to locate the desired video frame.

Figure 2:
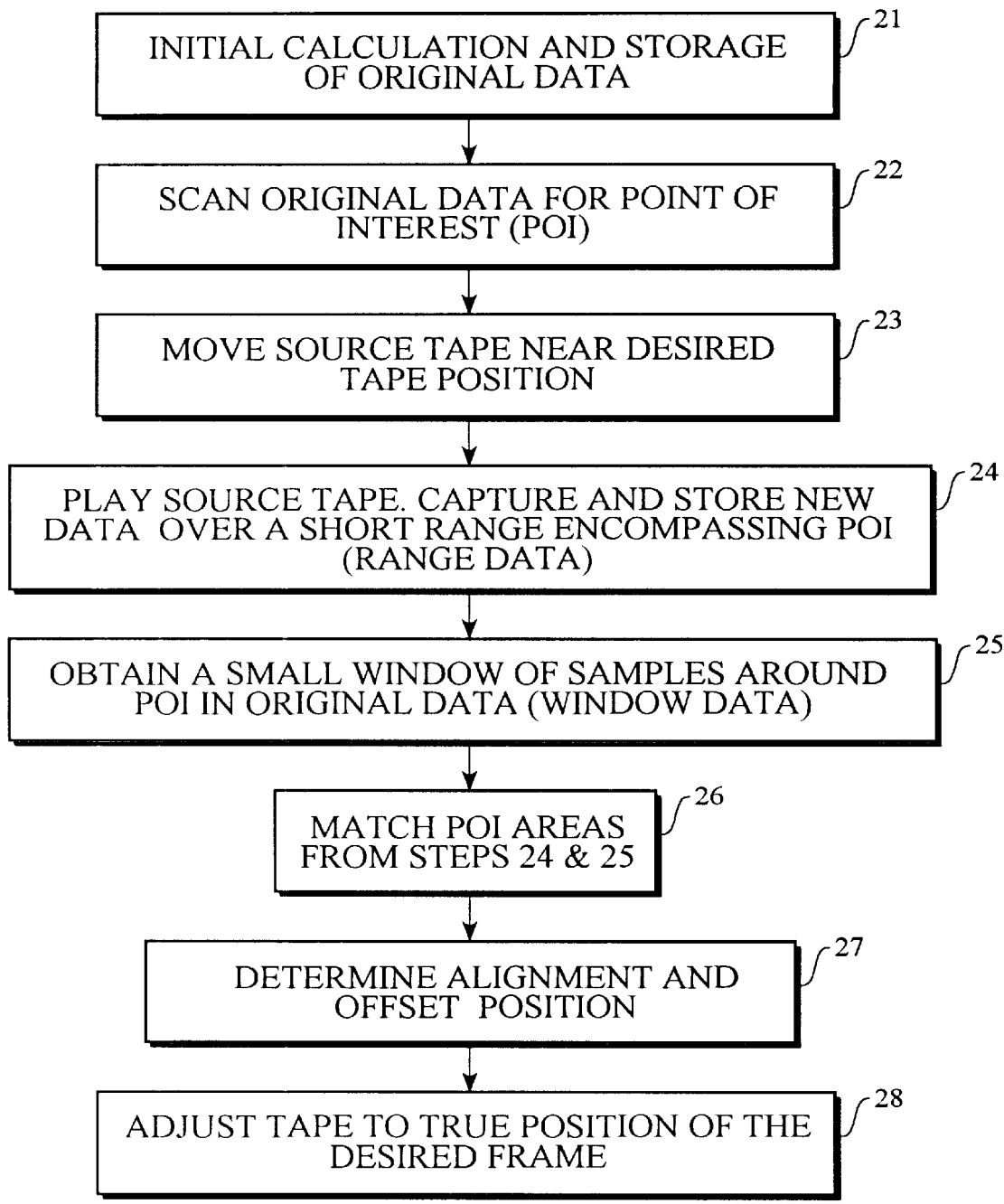
FIG. 2 is a flow chart of the overall algorithmic process of the present invention.

In FIG. 2, block 21 represents the initial calculation and storage of the original videotape data. Initial calculation and storage of scene detection data from the source videotape is usually done at the time when the video is captured and stored for editing purposes. The scene detection data is captured for each frame of the source video, and it can be cross-referenced to its source frame by frame number or by stored time code data. The scene detection data includes two values for each video frame: the overall average luminance, i.e. brightness, of the frame, hereafter referred to as the luminance value, and the average difference of pixel-by-pixel luminance between the video frame and the frame immediately before it, hereafter referred to as the delta value.

The calculation of the scene detect data from a single frame of video data first involves determining the luminance value for each pixel of low pass filtered video frame data and then determining the average frame luminance value by averaging all pixels in the filtered data. For example, using 8-bit luminance samples, there would be 256 possible brightness levels for each pixel in the video frame. Determining the luminance value for each pixel can be thought of as an extraction of a black and white scaled down version of a single video frame, and is independent of the video capture hardware and any data compression methods being employed. As an example of determining the luminance values from a video frame in a RGB format, the luminance for a pixel could be determined by the formula (R+G+B)/2. Determining the average frame luminance value is done by calculating a simple mean average of the luminance values of each single video frame, adding the value of all of the samples and dividing the result by the number of samples. This would result in an average frame luminance value for a particular frame. To determine the delta value of a frame, one would subtract luminance values from corresponding pixels in two consecutive frames, take the absolute value of the difference, i.e. making negative values positive, and calculate a simple mean average of all of these differences. The luminance and delta values for each frame of video are stored, for example, on a hard disk drive, for later use when one desires to find a specific tape position.

At a later time, a person can locate a specific video frame by continuing with the rest of the process of the present invention. Referring to FIG. 2, block 22 represents scanning the original scene detect data for a point of interest. A point of interest is a location on the tape, near the desired frame location, that is characterized by unusual localized changes in the scene detection data that easily distinguish a few samples from surrounding data. An example of a point of interest, where there would be a large change in the scene detection data, would be a change of scene on the videotape. An illustration of how a scene change would be reflected in the scene detect data, is shown in FIG. 3.

Figure 3:
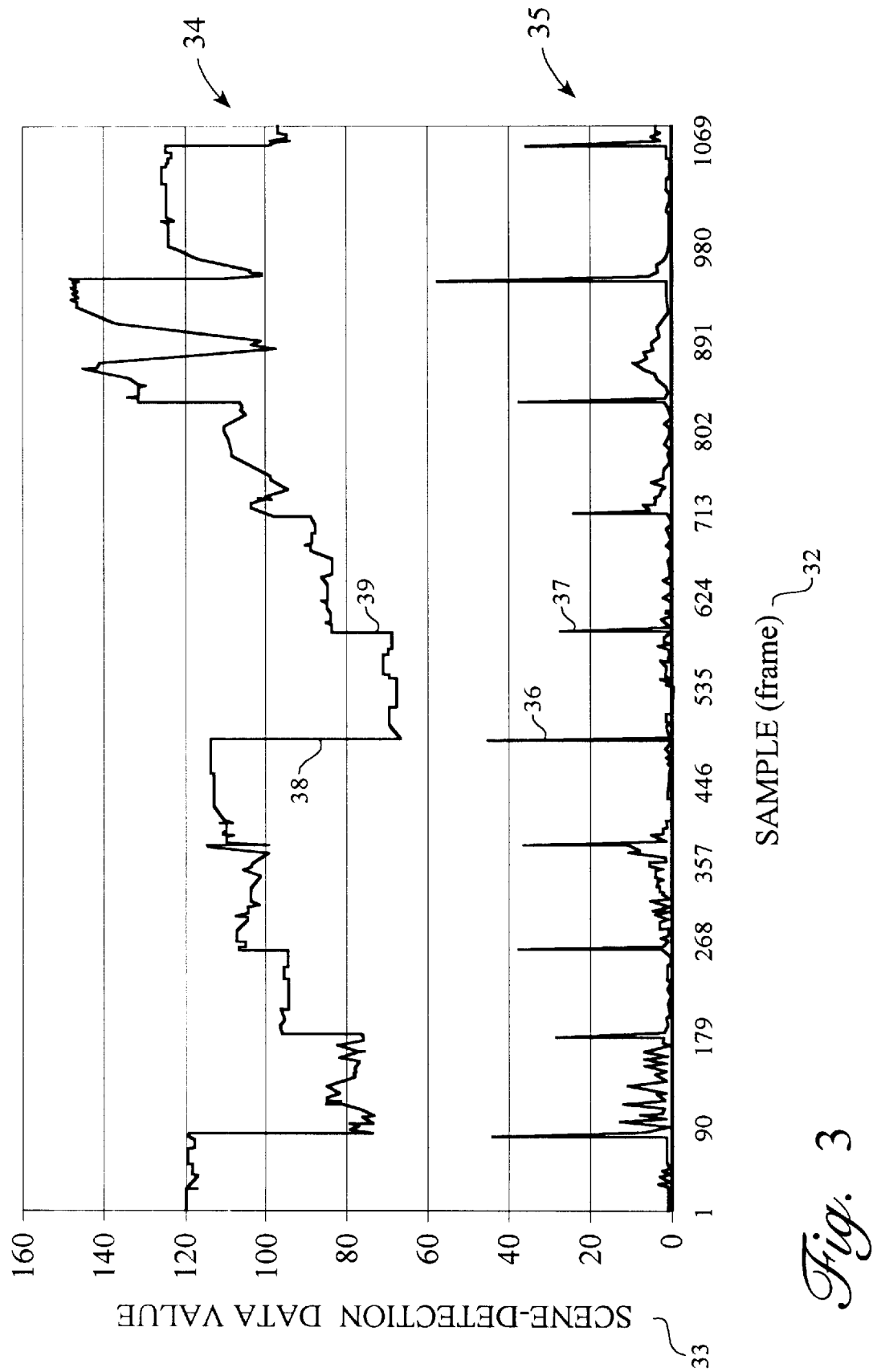
FIG. 3 is a graph of scene detect data, specifically luminance values and change of luminance values.

In FIG. 3, the X-axis 32 shows the sample frame numbers and the Y-axis 33 shows the scene detect data values. The top graph 34 shows the overall average luminance of the frame, while the bottom set of data 35 shows the delta values. As can be seen by the graph, a unusual localized change in the scene detect data can be seen at point 36 on the delta graph 35, and at point 38 on the average luminance graph 34. The sample frame number corresponding to points 38 and 36 would denote a frame to be used as a point of interest. The point of interest is characterized in the luminance data 34 by the large drop in luminance value at point 38, which would indicate a change of scene or a noticeable change in the brightness of the video. This change is illustrated also by point 36 in the delta value graph 35. Another example of a potential point of interest would be at point 39 on the luminance graph 34, corresponding to point 37 on the delta graph 35. The reason for using a point of interest in this process is because long periods of video without much change from one frame to the next will not afford many good candidates for pattern matching. The seek algorithm used in the present invention relies on pattern matching to synchronize the tape to its true position. By finding a point of interest near the desired seek point, one can match the data patterns over a short period, such 10 seconds, in order to synchronize the tape to its true position. The preferred location for a point of interest is some distance before the start of the desired seek point, for example, about 10 seconds, but not too far away, for example, not more than 60 seconds away.

As stated earlier, a method to find the point of interest would be to start from a given point in the scene detection data, for example, 10 seconds before the desired seek position, and examine the frame luminance and delta values one at a time. In this case, one would move back through the data to samples representing earlier positions on the tape. Then, a point of interest would be detected at a point where an unusually high delta value is found accompanied by an unusually large change in the luminance value from one frame sample to the next. An example of a high delta value would be a value of more than 50% of the highest value in the range being searched. An example of an unusually large change in the delta value would be a change of more than 40%. If no point of interest candidate is found within the range being searched, then one can lower the threshold of the amount of change in the values required for a point of interest and repeat the test. Eventually, a suitable point of interest will be found in the scene detection data.

Referring back to FIG. 2, the next block 23 represents moving the source tape near the desired tape position. While block 22 involved scanning the original data for a point of interest, block 23 involves moving the actual source tape to a point near the desired tape position. The next block 24, represents playing the source tape at that point and capturing and storing scene detection data for a short period of time, for example, 10 seconds. The new data that is being stored should encompass the point of interest that was found in step 22. The next block 25 represents obtaining a small window of samples, for example, about 2 seconds around the point of interest in the original data. This window of samples from the original data would then be compared to the range of samples captured from the new data in step 24. Then, proceeding to block 26, one would match up the point of interest areas. By matching the point of interest areas, one can determine the alignment position of the tape.

Figure 4:
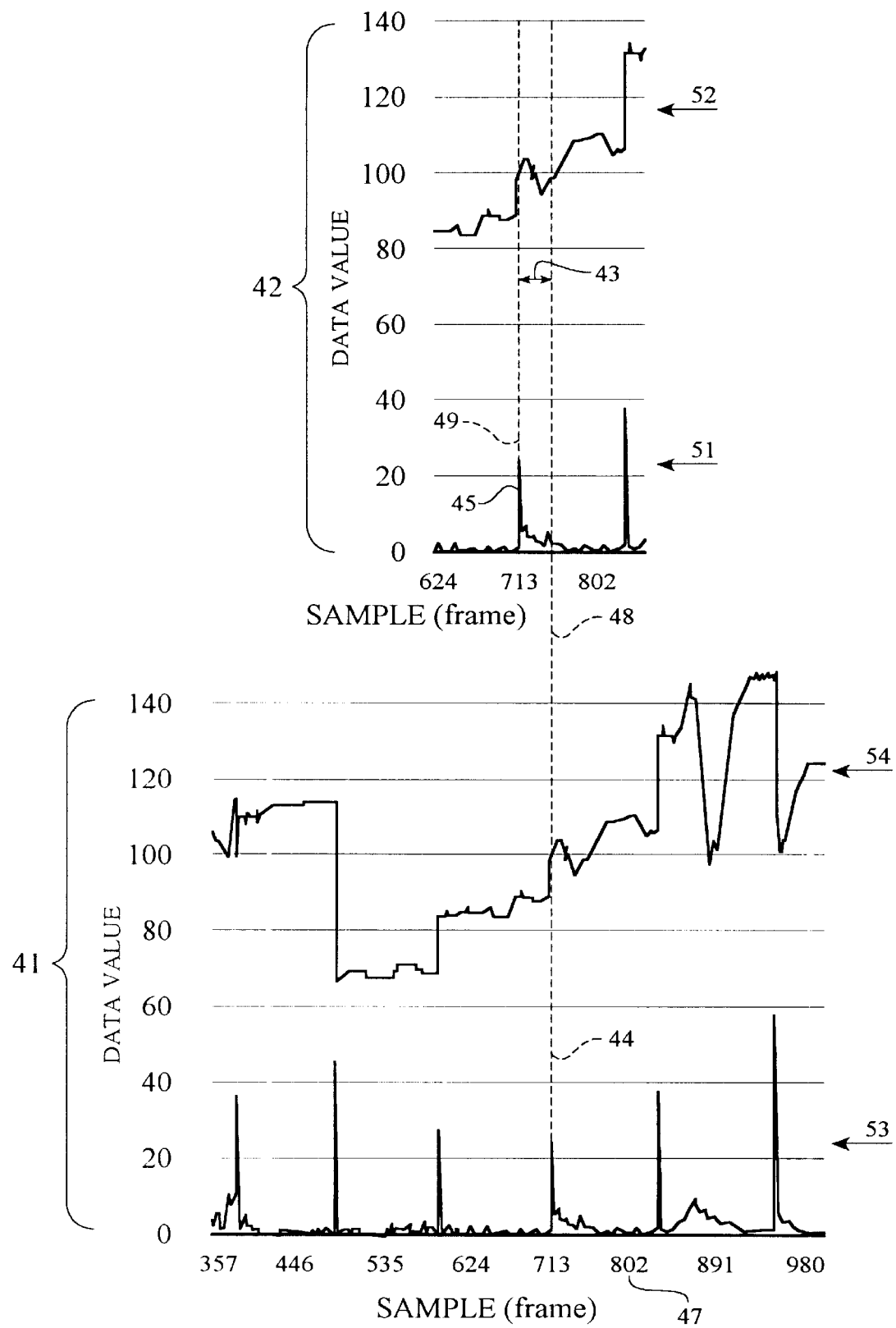
FIG. 4 is a graph showing a comparison of scene detect data from the originally captured data to scene detect data obtained from the source tape.

The concept of matching up of the point of interest areas, block 26, is illustrated in FIG. 4. FIG. 4 shows two scene detection data graphs. One graph is the range data 41, which is the new data stored from the video tape as described in block 24. The other graph is the window data 42, which are the samples around the point of interest in the original data that were captured in block 25. The X-axis shows the sample frame numbers. Referring to the range data 41, the data in the top of the graph is the luminance data 54 and the data shown at the bottom of the graph is the delta data 53. Referring to the window data 42, the top graph is the luminance data 52 and the bottom graph is the delta data 51.

In the range data 41, one can see a point of interest at point 44. The corresponding point of interest in the window data from the original capture data 42 is point 45. The reference lines 49 and 48 correspond to the respective points of interest 45 and 44. From the comparison of the reference lines, one can see that the point of interest 44 in the new data, i.e. range data, occurs in a later frame than the point of interest 45 in the original data. Therefore, there is an offset 43 between the two points of interest. The offset between the two points of interest can be used to determine the location of the desired frame. Referring back to FIG. 2, once the alignment and offset position has been determined in block 27, as illustrated in FIG. 4, the next block 28 represents adjusting the tape either forward or backward depending on the offset 43 to find the true position of the desired frame.

Referring back to blocks 26 and 27, once the range samples from the new data have been collected, the matching and offset determination steps, illustrated in FIG. 4, are actually carried out in the present invention by a matching algorithm in the computer software, which is carried out in the CPU. The matching algorithm is used to find the window data within the range. Since the same video data from the tape is captured using the same means, the data should be numerically similar, but it may not be identical due to the imprecise nature of the analog video equipment. A simple matching algorithm that is commonly used is referred to as a least squares method algorithm. In the least squares method algorithm, the sum of the squares of the differences of window samples is used to calculate a matching score for a particular alignment of the window within the range, with a lower score indicating a better match for that position. Each position of the window within the range is tested for this score and the position with the lowest score indicates a match.

Finding the window in the expected position, i.e. the point of interest aligns with the center of the range, indicates that no adjustment is required and that the tape is at the correct position. Any offset from this position in one direction or the other indicates a need for a corresponding correction in the assumed position of the tape. If the tape position after this calculation is a few seconds before the desired seek position i.e., the point of interest was found in its preferred area, then the tape is allowed to continue playing until the desired seek point is reached. If the tape position is too early, or too late to play to the desired seek position, an approximate seek method is used to reach the desired position, taking into consideration the calculated offset to adjust the tape time. A single, short seek using the approximate seek method will not lose much accuracy, since seek accuracy is lost cumulatively over many seek functions and over long tape distances.

Figure 5:
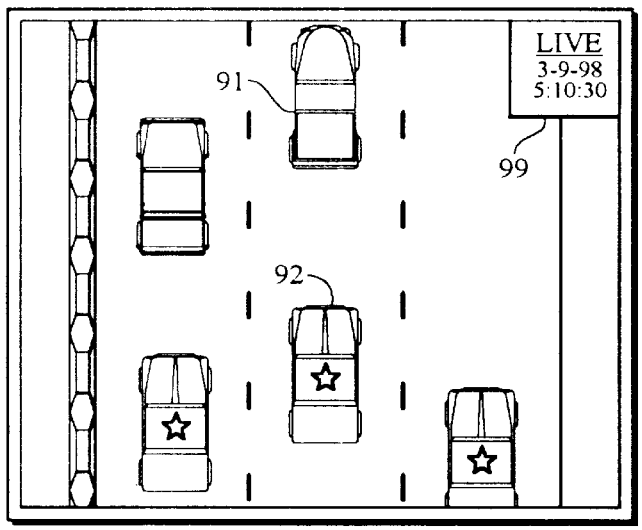
FIG. 5 is a representation of a video frame from a hypothetical event that was captured on videotape.
Figure 6:
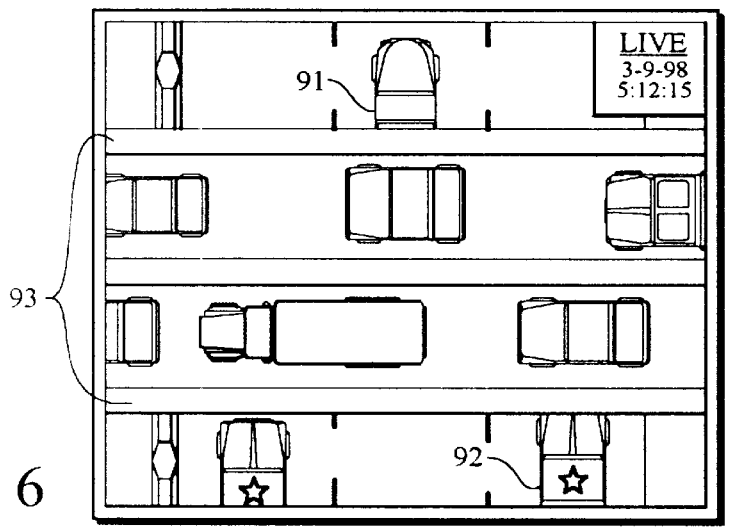
FIG. 6 is a representation of a video frame that is an example of a candidate for use as a point of interest in the process of the present invention.
Figure 7:
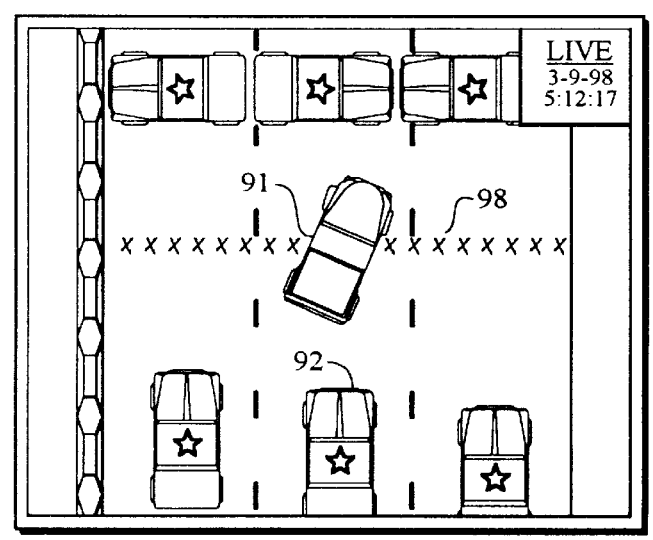
FIG. 7 is a representation of a video frame that is an example of a video frame desired to be located by a video editor.

FIGS. 5, 6 and 7 show frames of a videotape capturing a hypothetical car chase. FIG. 5 shows a video frame from the car chase that is typical of the majority of the frames on the videotape. In the video frame, the suspect's car 91 is being chased by several police cars 92 in a freeway chase. The video was taped from an overhead view and the video has time coding 99 in the upper right hand corner. It is not necessary to have time coding 99 on the video to implement the process of the present invention. In the hypothetical situation, the video editor desires to locate the frame where the suspect's car 91 is stopped and captured. FIG. 7 illustrates the desired frame, as it shows that the suspect's car 91 has run over some metal spikes 98 and has been stopped and surrounded by the police 92.

Referring to FIGS. 2 and 5, after this video was first captured, the original scene detection data would have been calculated and stored, block 21. At the time that the video tape is to be edited, the video editing software would begin the process shown in FIG. 2, at block 22, by scanning the original data for a point of interest. FIG. 6 illustrates the type of video frame that would be a good candidate to correspond to a point of interest. In FIG. 6, the suspect's car 91 and the police cars 92 are driving under an overpass 93 that crosses the freeway. If the previous frames to that of FIG. 6 did not show the overpass, and instead were similar to the frame shown in FIG. 5, then the scene detect data values for luminance and change of luminance (delta) at this frame would show an unusually large change, which would make it a good candidate to be a point of interest.

Next, the editing software one would move the source tape near the desired tape position, in block 23. This would entail moving the videotape to a point near the frame shown in FIG. 7, but preferably before the frame shown in FIG. 6. Then, in block 24 the software would play the source tape, capturing and storing new scene detection data over a short range that encompassed the point of interest scene shown in FIG. 6. Then, in block 25, some samples would be obtained from the original data near the point of interest. Then, in block 26, the point of interest areas from blocks 24 and 25 would be matched up and, in block 27, the alignment and offset position would be determined using the matching algorithm explained above. Then, the tape can be adjusted to the true position of the desired frame, as in block 28, and the video editing software would be able to locate the frame shown in FIG. 7 by adjusting the tape to the true position.

We claim:

1. A process for precisely identifying a desired location on a linear storage medium, particularly a magnetic tape, comprising:
    storing a first set of calculated scene detection data from each of a set of video frames on the tape;
    scanning the scene detection data to find a point of interest near the desired location;
    locating a reference point on the tape near the desired location, the reference point being prior to the point of interest;
    storing a second set of scene detection data from a set of video frames located around the reference point for a first number of samples;
    comparing the first and second sets of scene detection data to determine an offset; and
    adjusting the tape to the desired location using the determined offset.

2. The process of claim 1 wherein comparing the first and second sets of scene detection data includes comparing a second number of samples around the point of interest from the first set of scene detection data to first number of samples of the second set of scene detection data.

3. The process of claim 2 wherein the first number of samples is greater than the second number of samples.

4. The process of claim 1 wherein the first and second sets of scene detection data include a value for an overall average luminance of the video frame and a value for an average difference of pixel-by-pixel luminance between the video frame and an immediately prior video frame.

5. The process of claim 1 wherein locating a reference point comprises:
    resetting the tape, such that a starting position on the tape corresponds to a zero position on a tape counter;
    sending an appropriate tape transport command;
    reading the tape counter of a videotape device to determine a position near the reference point;

engaging a play mode; and waiting until the tape counter shows the reference point.

6. The process of claim 1 wherein locating a reference point involves the use of an infrared-controlled camcorder.

7. The process of claim 4 wherein scanning the scene detection data to find a point of interest further comprises:

examining the average luminance and average difference values for each video frame; and stopping the examination when an unusually high average difference value and an unusually high change in the average luminance value is found.

8. The process of claim 2 wherein a matching algorithm is used to compare the second set of scene detection data to the first set of scene detection data.

9. A process for precisely identifying a desired location on a linear storage medium, particularly a magnetic tape, comprising:

storing a first set of calculated scene detection data from each of a set of video frames on the tape;

scanning the scene detection data to find a point of interest near the desired location;

searching the tape for a reference point the reference point being prior to the point of interest;

playing the tape from the reference point and storing a second set of scene detection data for a first number of samples;

comparing a second number of samples around the point of interest from the first set of scene detection data to the second set of scene detection data to determine an alignment position;

determining an offset from the alignment position of the first set of scene detection data and the second set of scene detection data; and adjusting the tape by the determined offset to find the desired location on the tape.

10. The process of claim 9 wherein the first number of samples is greater than the second number of samples.

11. The process of claim 10 wherein the first and second sets of scene detection data include a value for an overall average luminance of the video frame and a value for an average difference of pixel-by-pixel luminance between the video frame and an immediately prior video frame.

12. The process of claim 11 wherein scanning the scene detection data to find a point of interest further comprises:

examining the average luminance and average difference values for each video frame; and stopping the examination when an unusually high average difference value and an unusually high change in the average luminance value is found.

13. The process of claim 9 wherein searching the tape for a reference point further comprises:

resetting the tape, such that a starting position on the tape corresponds to a zero position on a tape counter;

sending an appropriate tape transport command;

reading the tape counter of a videotape device to determine a position near the reference point;

engaging a play mode; and waiting until the tape counter shows the reference point.

14. The process of claim 9 wherein searching the tape for a reference point involves the use of an infrared-controlled camcorder.

15. The process of claim 9 wherein comparing the first set of scene detection data to the second set of scene detection data to determine an alignment position is accomplished by using a matching algorithm.

16. A process for precisely identifying a desired location on a linear storage medium, particularly a magnetic tape, comprising:

calculating and storing a first set of scene detection data from each of a set of video frames on the tape;

scanning the first set of scene detection data to find a point of interest near the desired location, the point of interest being at a location on the tape where the scene detection data is characterized by unusual localized changes;

searching the tape for a reference point near the desired location, the reference point being located prior to the point of interest;

playing the tape from the reference point and storing a second set of scene detection data for a first number of samples;

comparing a second number of samples around the point of interest from the first set of scene detection data to the second set of scene detection data by use of a matching algorithm to determine an alignment position;

determining an offset from the alignment position of the first set of scene detection data and the second set of same detection data; and adjusting the tape by the determined offset to find the desired location on the tape.

17. The process of claim 16 wherein the first and second sets of scene detection data include a value for an overall average luminance of the video frame and a value for an average difference of pixel-by-pixel luminance between the video frame and an immediately prior video frame.

18. The process of claim 17 wherein scanning the scene detection data to find a point of interest further comprises:

examining the average luminance and average difference values for each video frame; and stopping the examination when an unusually high average difference value and a unusually high change in the average luminance value is found.

19. The process of claim 16 wherein searching the tape for a reference point further comprises:

resetting the tape, such that a starting position on the tape corresponds to a zero position on a tape counter;

sending an appropriate tape transport command;

reading the tape counter of a videotape device to determine a position near the reference point;

engaging a play mode; and waiting until the tape counter shows the reference point.

20. The process of claim 16 wherein searching the tape for a reference point involves the use of an infrared-controlled camcorder.

* * * * *